United States Patent
Lin

(10) Patent No.: US 8,602,660 B2
(45) Date of Patent: Dec. 10, 2013

(54) OPTICAL FIBER CONNECTOR

(75) Inventor: I-Thun Lin, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/311,567

(22) Filed: Dec. 6, 2011

(65) Prior Publication Data

US 2013/0129286 A1   May 23, 2013

(30) Foreign Application Priority Data

Nov. 23, 2011 (TW) .............................. 100142934 A

(51) Int. Cl.
 *G02B 6/36* (2006.01)
 *G02B 6/38* (2006.01)
(52) U.S. Cl.
 USPC ................... 385/89; 385/53; 385/65; 385/88; 385/93

(58) Field of Classification Search
 USPC ................ 385/15, 31, 33, 34, 52, 53, 60, 74, 385/76–78, 92–94, 65, 88, 89
 See application file for complete search history.

(56) References Cited

U.S. PATENT DOCUMENTS

| | | | |
|---|---|---|---|
| 5,896,480 A * | 4/1999 | Scharf et al. | 385/88 |
| 2003/0026554 A1* | 2/2003 | Jin et al. | 385/89 |
| 2006/0104576 A1* | 5/2006 | Nagasaka | 385/93 |
| 2012/0070118 A1* | 3/2012 | Ko | 385/33 |

* cited by examiner

*Primary Examiner* — K. Cyrus Kianui
*Assistant Examiner* — Hung Lam
(74) *Attorney, Agent, or Firm* — Altis Law Group, Inc.

(57) ABSTRACT

An optical fiber connector including a main body and a block is illustrated. The main body includes a first side, an opposite second side, and a first top surface between the first side and the second side. The first side includes at least two protruding lenses. The first top surface defines a recess, and the recess includes an open end at the second side. The block is securely retained within the recess. The block defines at least two through holes respectively aligned with the at least two lenses. Each of the at least two through holes is securely retaining one optical fiber.

6 Claims, 4 Drawing Sheets

OPTICAL FIBER CONNECTOR

BACKGROUND

1. Technical Field

The present disclosure relates to an optical fiber connector.

2. Description of Related Art

Optical fibers are widely used in fiber-optic communications, which permit transmission over longer distances and at higher bandwidths (data rates) than other forms of data communication. Generally, an optical fiber connector is needed to connect the optical fibers with an optical fiber jack. Although the conventional optical fiber connectors can satisfy basic requirements, it is always desirable and useful for a new type of optical fiber connector.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are now described in detail, with reference to the accompanying drawings.

Figure 1:
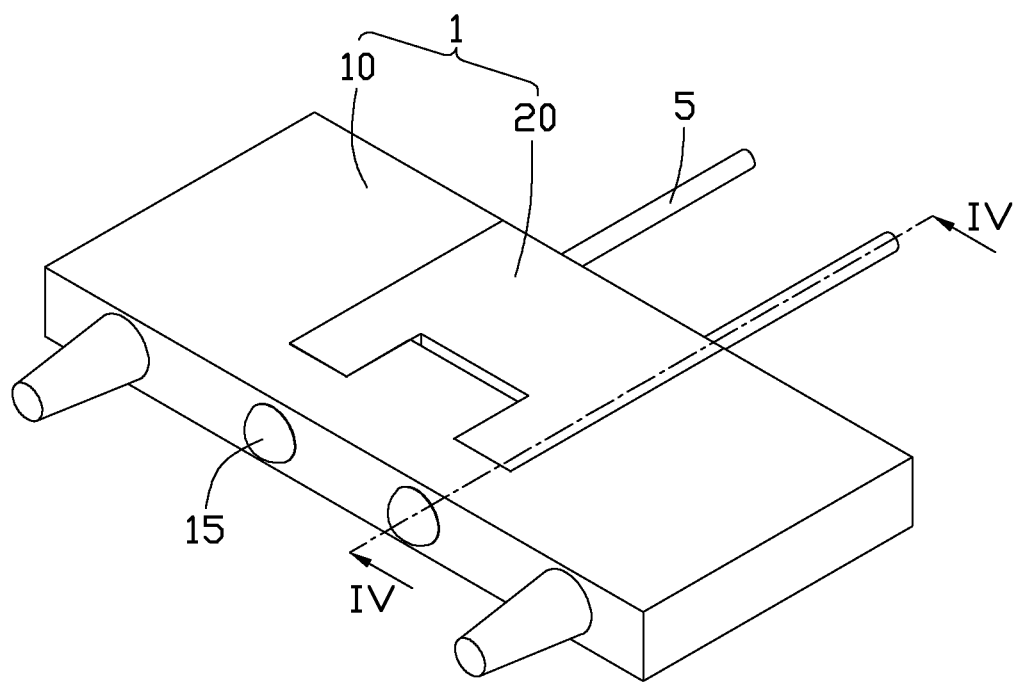
FIG. 1 is an isometric view of an optical fiber connector according to an exemplary embodiment.

Referring to FIG. 1, an optical fiber connector 1 according to an exemplary embodiment is illustrated. The connector 1 includes a main body 10 and a block 20 secured to the main body 10 for fixing at least two optical fibers 5. Each optical fiber 5 includes a fiber core 51 and a protective layer 52 wrapped around the fiber core 51. The main body 10 includes at least two lenses 15 respectively aligned with the optical fibers 5 for radiating optical signals.

Figure 2:
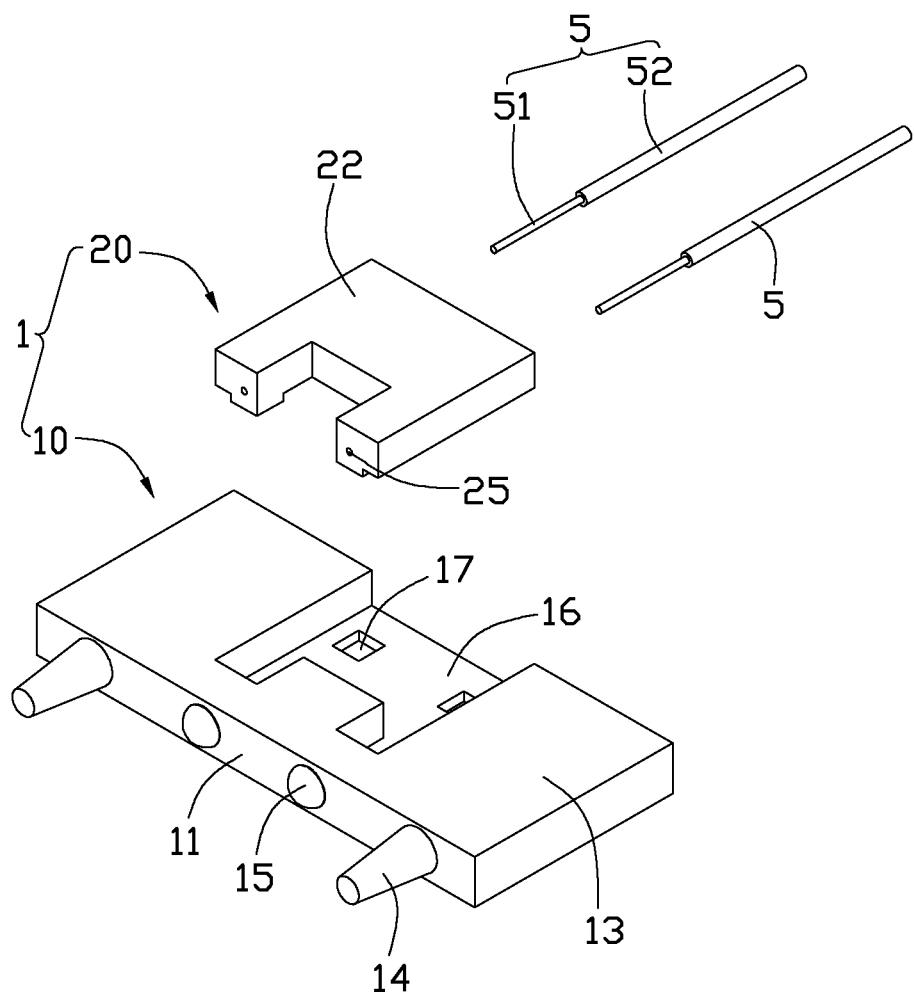
FIG. 2 is an exploded, isometric view of the optical fiber connector of FIG. 1.
Figure 3:
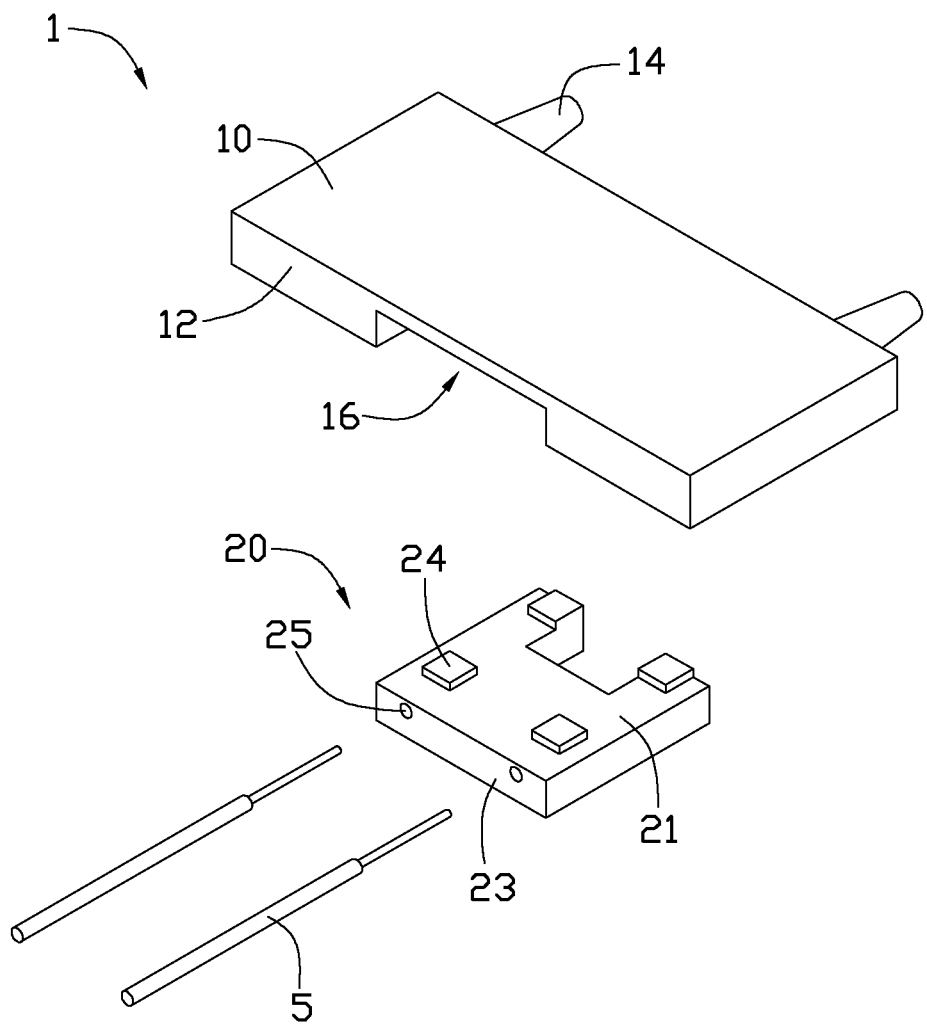
FIG. 3 is similar to FIG. 2, but viewed from a reverse perspective.

Referring to FIGS. 2 and 3, the main body 10 is substantially rectangular and includes a first, front side 11, a second, back side 12 opposite the first side 11, and a first, top surface 13 between the first side 11 and the second side 12. The first side 11 includes two positioning posts 14 and at least two protruding lenses 15. The main body 10 defines a recess 16 in the top surface 13, and four positioning holes 17 in a bottom of the recess 16. The recess 16 includes an open end at the back side 12.

Figure 4:
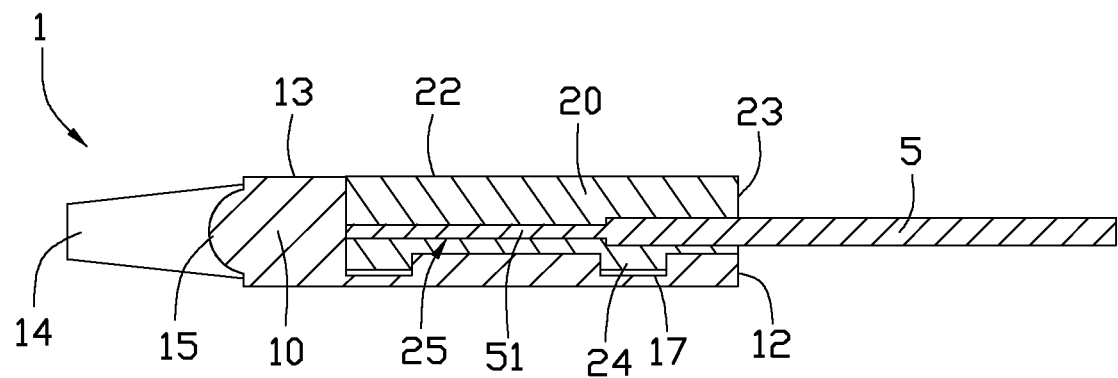
FIG. 4 is a cross-section view of the optical fiber connector, taken along line IV-IV of FIG. 1.

Referring also to FIG. 4, the block 20 is shaped to match the recess 16 of the main body 10. The block 20 includes a bottom surface 21 contacting the bottom of the recess 16, a second top surface 22 opposite the bottom surface 21, and a third side 23 between the bottom surface 21 and the second top surface 22. The second top surface 22 is substantially coplanar with the first top surface 23. The third side 23 is substantially coplanar with the second side 12. The bottom surface 21 includes four protruding positioning blocks 24. The positioning blocks 24 are securely retained within the positioning holes 17, thereby securing the block 20 to the main body 10. In the embodiment, the block 20 is adhered to the main body 10 by glue applied in the positioning holes 17. The third side 23 defines at least two stepped through holes 25 respectively aligned with the lenses 15 for receiving optical fibers 5. In the embodiment, the optical fibers 5 are adhered to the block 20 by glue applied in the through hole 25.

When in use, the connector 1 is inserted into a corresponding jack, and optical signals are transmitted through the fibers 5. The lenses 15 radiate the optical signals into the jack.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. An optical fiber connector comprising:
   a main body comprising a first side, an opposite second side, and a first top surface between the first side and the second side, the first side comprising at least two protruding lenses, and the first top surface defining a recess, and the recess comprising an open end at the second side and defining four positioning holes in a bottom thereof; and
   a block securely retained within the recess and defining at least two through holes respectively aligned with the at least two lenses, each of the at least two through holes securely retaining one optical fiber, the block comprising a bottom surface contacting the bottom of the recess and four protruding positioning blocks securely retained within the positioning holes.

2. The optical fiber connector as described in claim 1, wherein the main body further comprises two positioning posts protruding from the first side.

3. The optical fiber connector as described in claim 1, wherein the block is adhesively fixed to the main body by glue applied in the positioning holes.

4. The optical fiber connector as described in claim 1, wherein the block comprises a second top surface substantially coplanar with the first top surface and a third side substantially coplanar with the second side.

5. The optical fiber connector as described in claim 1, wherein the through hole is a stepped hole.

6. The optical fiber connector as described in claim 1, wherein the optical fibers are adhesively fixed to the block by glue applied in the through holes.

* * * * *